United States Patent
Koshiro et al.

(10) Patent No.: US 6,906,713 B2
(45) Date of Patent: Jun. 14, 2005

(54) DISPLAY OBJECT GENERATION METHOD IN INFORMATION PROCESSING EQUIPMENT, PROGRAM TO CONTROL AND EXECUTE SAME, AND RECORDING MEDIUM FOR STORING PROGRAM

(75) Inventors: Yuzo Koshiro, Hino (JP); Hideki Koyama, Hino (JP); Junichi Tsuchiya, Tokyo (JP)

(73) Assignee: SEGA Corporation, Tokyo (JP)

( * ) Notice: Subject to any disclaimer, the term of this patent is extended or adjusted under 35 U.S.C. 154(b) by 236 days.

(21) Appl. No.: 09/987,462

(22) Filed: Nov. 14, 2001

(65) Prior Publication Data

US 2002/0090993 A1 Jul. 11, 2002

(30) Foreign Application Priority Data

Nov. 15, 2000 (JP) ........................................ 2000-348416

(51) Int. Cl.$^7$ ............................................... G06T 17/00
(52) U.S. Cl. ........................ 345/420; 345/473; 345/629; 345/581; 463/30; 463/31
(58) Field of Search ................................. 345/419, 420, 345/473, 581, 345, 629, 418; 463/30, 31

(56) References Cited

U.S. PATENT DOCUMENTS 5,692,117 A 11/1997 Berend et al.

6,384,819 B1 * 5/2002 Hunter ........................ 345/418

OTHER PUBLICATIONS

Teddy: A Sketching Interface for 3D Freeform Design; Takeo Igarashi et al.

Bloomenthal, Jules and Wyvill, Brian, *Interactive Techniques for Implicit Modeling*, 1990 Symposium on Interactive 3D Graphics, Snowbird, UT, Mar. 25–28, 1990, vol. 24, No. 2, pp. 109–116, XP002250454.

* cited by examiner

*Primary Examiner*—Kimbinh T. Nguyen
(74) *Attorney, Agent, or Firm*—Dickstein Shapiro Morin & Oshinsky LLP

(57) ABSTRACT

A display object generation method in a computer game, a program to execute and control the same, and a recording medium for storing the program, enabling the game player himself to generate a display object with a desired shape, to be manipulated by the game player himself, are provided. The program is executed by information processing equipment, wherein a skeleton model set for the display object is displayed on a display device, an input outline trace is also displayed on the display device, the input outline trace is associated with the skeleton model of the above display object, the outline trace associated with the skeleton model is expanded and converted into a three-dimensional display object image, and the data of the expanded and converted three-dimensional display object image is displayed on the above display device.

29 Claims, 20 Drawing Sheets

DISPLAY OBJECT GENERATION METHOD IN INFORMATION PROCESSING EQUIPMENT, PROGRAM TO CONTROL AND EXECUTE SAME, AND RECORDING MEDIUM FOR STORING PROGRAM

BACKGROUND OF THE INVENTION

1. Field of the Invention

This invention relates to a display object generation method in information processing equipment, a program to execute and control the same, and a recording medium for storing the program.

2. Description of the Related Art

Among game programs which are executed by computer game equipment as information processing equipment, there are numerous game programs which can execute competitive games between display objects manipulated by the game player, and display objects manipulated by a plurality of opposing game players or controlled by the program.

In some of the competitive games executed by these game programs, the game player would select one display object from among a plurality of display objects, and in the course of the game would modify parameters which define the characteristics of the display object. Thus through multiple executions of the game, it would be possible to derive pleasure by cultivating the display object manipulated by the game player.

However, the above plurality of display objects are prepared in advance as display object data, and prior to game execution, the game player selects a display object which is closest to the game player's preferences from among the above plurality of display objects. At this time, the parameters provided as initial values are unique for the selected display object.

Hence there exist limits to the enjoyment for the game player to play a game by manipulating a display object matched to the game player's preferences with greater variety.

SUMMARY OF THE INVENTION

An object of this invention is to provide a display object generation method, a program to execute and control the same, and a recording medium for storing the program, in a computer game in which the game player can himself generate a display object with a desired shape, and can make it a display object manipulated by the game player himself.

According to a display object generation method and a program to execute and control the same in an information processing equipment of this invention which achieves the above object, a skeleton model set for the display object is displayed on a display device, an input outline trace is displayed also on the display device, the input outline trace is associated with the skeleton model of the above display object, the outline trace associated with the above skeleton model is expanded and converted into a three-dimensional display object image, and the data of the above expanded and converted three-dimensional display object image is displayed on the above display device. Display object generation programs according to the present invention perform the various steps for generating a display object as described above as well as in the following descriptions.

According to another preferred aspect of a display object generation method and a program to execute and control the same of this invention which achieves the above object, the above-described outline trace is converted into closed outline traces corresponding to each of a plurality of skeletal parts constituting the skeleton model.

According to another preferred aspect of a display object generation method and a program to execute and control the same of this invention which achieves the above object, display of the skeleton model of the above selected display object on the above display device is performed by superposing a basic shape image of the above display object and the skeletal parts constituting the above skeleton model.

According to still another preferred aspect of a display object generation method and a program to execute and control the same of this invention which achieves the above object, the display object generation program is included in a game program executed by the above information processing equipment.

According to still another preferred aspect of a display object generation method and a program to execute and control the same of this invention which achieves the above object, a basic body having specific attribute parameters corresponding to the above skeleton model is set in advance, and attribute parameters, modified based on the attribute parameters of the above basic body according to the proportion of the outline trace associated with the above skeleton model to the data of the above basic body, are attached to the data of the above expanded and converted three-dimensional display object image.

According to still another preferred aspect of a display object generation method and a program to execute and control the same of this invention which achieves the above object, when there are a plurality of the above input outline traces for the above skeleton model, conversion is performed into a single closed outline trace formed by connecting the outermost traces of the plurality of outline traces.

According to still another preferred aspect of a display object generation method and a program to execute and control the same of this invention which achieves the above object, when the above input outline trace is input spanning a plurality of skeletal parts, the above input outline trace is converted into closed outline traces corresponding to each of the skeletal parts.

According to still another preferred aspect of a display object generation method and a program to execute and control the same of this invention which achieves the above object, the behavior mode of the generated three-dimensional display object is characterized by the above attribute parameters.

According to still another preferred aspect of a display object generation method and a program to execute and control the same of this invention which achieves the above object, the above attribute parameters can be modified by selecting a texture to be applied to the generated three-dimensional display object.

Hereupon, it is to be noted that a recording medium for storing the above-described program is still another preferred aspect of the present invention.

The features including those other than the above of this invention will be made clearer through the embodiments of this invention explained below, referring to the drawings.

DESCRIPTION OF THE PREFERRED EMBODIMENTS

Figure 1:
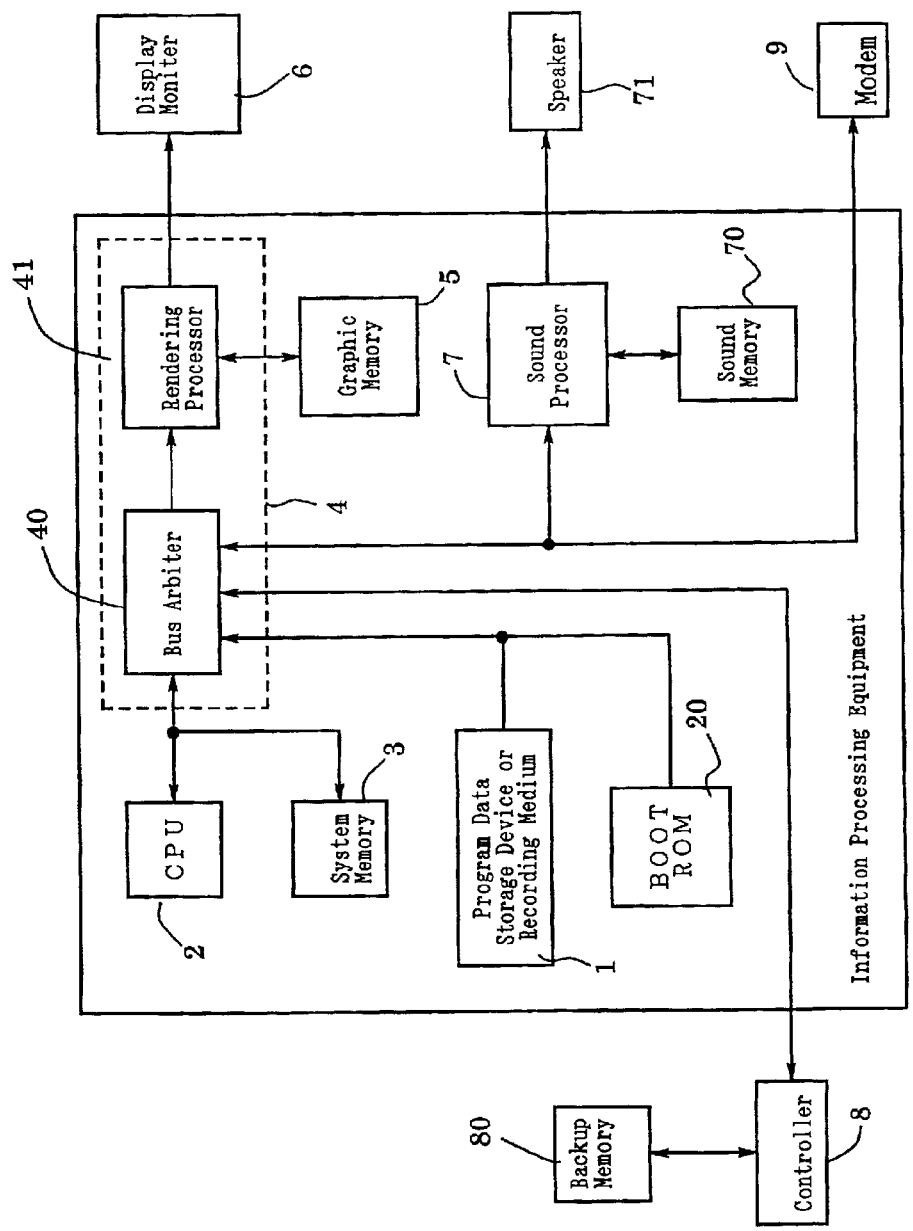
FIG. 1 is a block diagram of one example of game equipment as a computer system to which this invention is applied.

FIG. 1 is a block diagram of one example of information processing equipment to which this invention is applied.

In FIG. 1, the information processing equipment has a program data storage device or recording medium 1 (including an optical disc and optical disc drive, or similar) on which programs and data (including image and music data) are stored.

In the information processing equipment, the CPU 2 executes programs, controls the entire system, and performs coordinate calculations and similar for image display. The system memory 3 stores programs and data necessary for the CPU 2 to perform processing.

The boot ROM 20 stores programs and data necessary to start up the information processing equipment. The bus arbiter 40 controls the flow of program data between each of the blocks of the information processing equipment and any connected external devices. The rendering processor 41 reproduces movie data read from the program data storage device or recording medium 1, and generates images for display according to manipulations by the game player and the progress of the game.

Graphic data and similar necessary for image generation by the rendering processor 41 is stored in the graphic memory 5. The sound processor 7 reproduces music data read from the program data storage device or recording medium 1, and generates sound effects and voices according to manipulations by the game player and the progress of the game. Sound data or similar necessary to generate sound effects and voices is stored in the sound memory 70.

The above bus arbiter 40 is connected to a modem 9, which connects to and performs communications with other information processing equipment and network servers via telephone lines. The modem 9 connected to this information processing equipment uses telephone circuits; however, a terminal adapter (TA) which also uses telephone circuits, or a cable modem which uses cable TV circuits, as well as communication equipment employing wireless communication means using portable telephones, PHS (personal handyphone system) devices, or optical fiber communication means or similar, can also be used.

The bus arbiter 40 is connected to the controller 8 such as a control pad or a tablet, which outputs to the information processing equipment information used to control the information processing equipment or connected external devices according to manipulations by the game player. The controller 8 is also connected to a backup memory 80, which stores and saves parameters and other data generated by the program.

The information processing equipment is also connected externally to a speaker 71 which reproduces audio signals output from the sound processor 7, and a display monitor 6 which displays image signals output from the rendering processor 41.

Ordinarily, information processing equipment requests operation information from the controller 8 such as a tablet or a control pad at prescribed time intervals; the controller 8 is designed to output operation information from a trigger button, touch panel, or similar to the information processing equipment each time there is such a request.

The information processing equipment then uses the operation information received from the controller 8 as parameters when the CPU 2 executes the application program in system memory 3, causes the rendering processor 41 and sound processor 7 to perform image processing and audio processing reflecting operations by the game player, and outputs images and audio to the display monitor 6 and speaker 71.

Application of this invention is not impeded even if the above information processing equipment is TV game equipment, a personal computer or workstation, a telephone set or communication device with image display functions, or an image display device having communication and information processing functions.

If the program executed by the above information processing equipment is assumed to be a game program, then the game program comprises data for display objects, in addition to program data to control game execution.

In the application of this invention, "display objects" refers to humans and animals, monsters, robots and other characters, as well as automobiles, airplanes, boats, bicycles and other vehicles, and any and all other objects displayed by a display device which can be manipulated by the game player.

The above bus arbiter 40 and rendering processor 41 can be configured integrally as a DSP (digital signal processor) 4, having functions for conversion of coordinates of display object data having three-dimensional coordinates and for application of texture data to polygons, according to program data controlling the game execution.

In the above conversion functions of the coordinates of display object data, display object data having world coordinates is converted into three-dimensional point-of-view coordinates, and then into two-dimensional coordinates. Display object data resulting from conversion into two-dimensional coordinates and application of texture data is sent to the graphic memory 5, and is successively read out and converted into video signals for display as images on the display monitor 6.

Based on data controlling game execution, digital audio signals are processed by the sound processor 7, converted into analog audio signals and reproduced as audio by the speaker 71, while synchronized with the above image display.

In this way, the information processing equipment which executes the game program according to this invention, contains a program that allows the game player to generate display objects as part of the above game program, or as a separate program.

When the display object generation program is part of a competitive game program as shown in one embodiment, the display object generation program is executed and controlled at an appropriate time, set in advance, in the progress of the competitive game program. It is preferable that execution at this appropriate time be performed prior to the stage of selection of competing display objects in the competitive game program.

Figure 2:
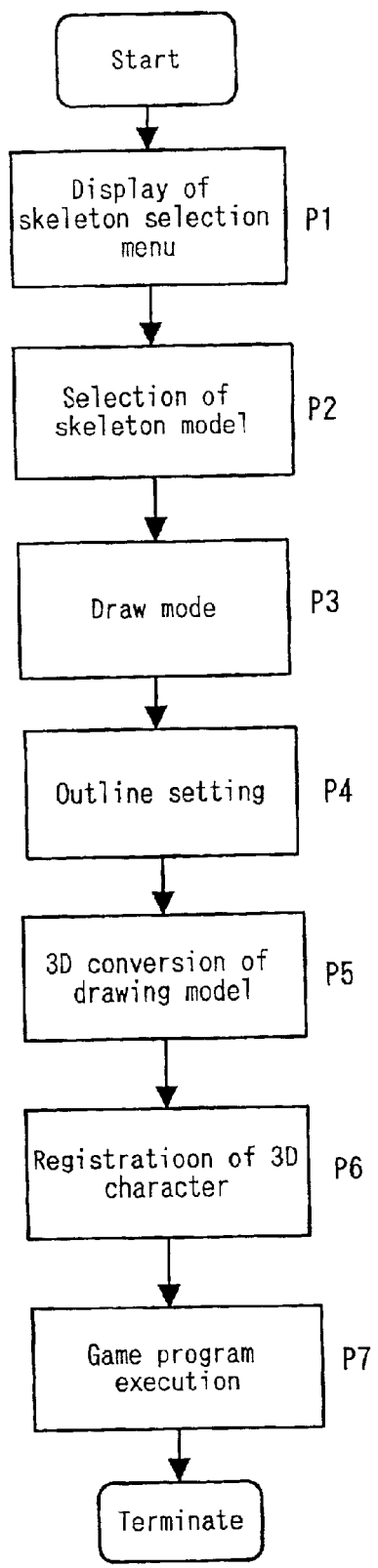
FIG. 2 shows the flow of processing of one embodiment of a display object generation program according to this invention.

FIG. 2 shows the flow of processing of one embodiment of a display object generation program according to this invention.

In FIG. 2, when the display object generation program is started, a skeleton selection menu screen is displayed on the display device 6 (process P1). Examples of this menu screen are shown in FIG. 3 and FIG. 4.

In the menu screen, a region I in the center displays the perspective skeleton model of the selected display object to be generated, and, on the periphery of region I, there are a plurality of display object selection buttons II. The game player uses a keyboard, mouse or other input device 8 connected to the game equipment shown in FIG. 1 to control the movement of the pointer III, in order to specify a desired display object selection button II (process P2).

Figure 3:
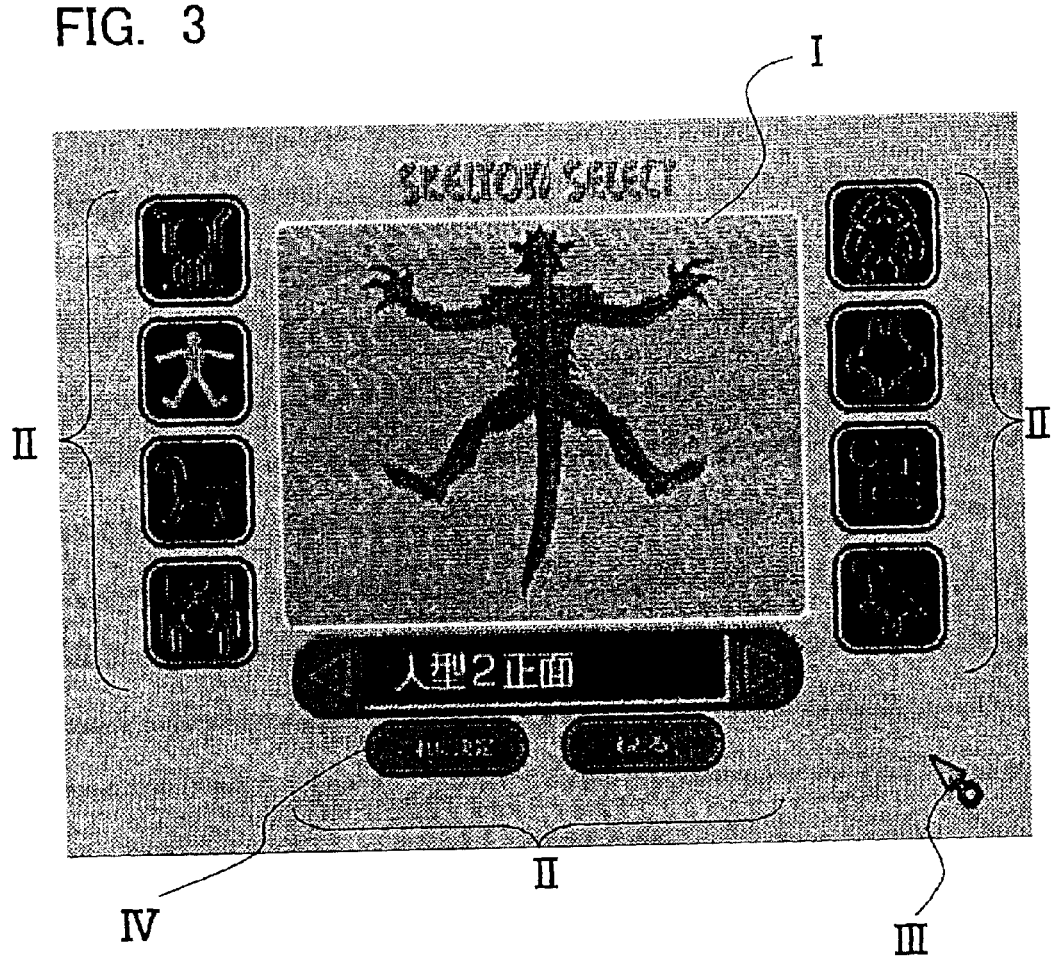
FIG. 3 is an example of selection of a human-type display object in a skeleton selection menu display (process P1), showing in perspective the skeleton corresponding to the selected display object.
Figure 4:
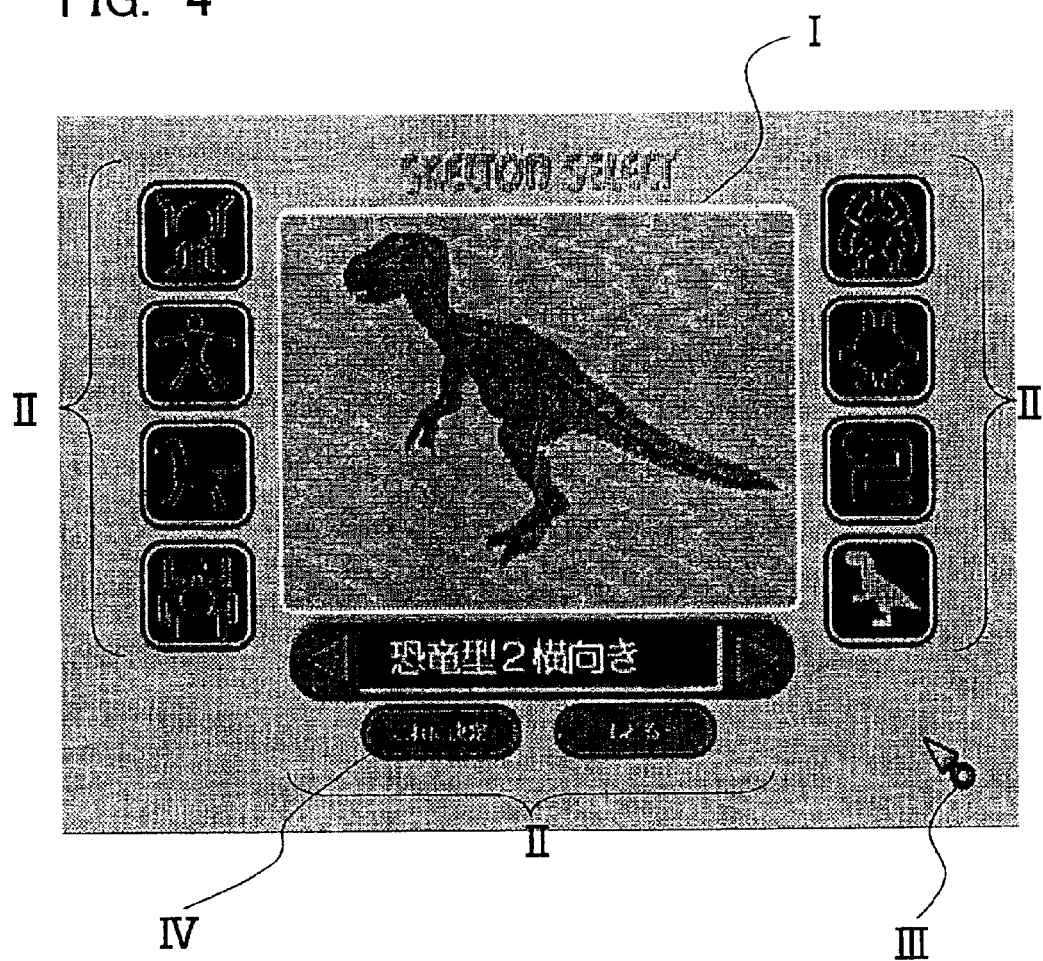
FIG. 4 is an example of selection of a dinosaur-type display object in a skeleton selection menu display (process P1), showing in perspective the skeleton corresponding to the selected display object.

FIG. 3 is an example in which a human-type display object is selected, and FIG. 4 is an example in which a dinosaur-type display object is selected; in each case, a perspective skeleton model is displayed as superposed with the basic shape image corresponding to the selected display object. In this invention, parameters are set for each of a plurality of skeletal parts constituting the perspective skeleton model, as explained below.

As shown in FIG. 3 and FIG. 4, a perspective skeleton model of the selected display object is displayed; when confirming this, the game player positions the pointer III on the confirmation button IV to confirm the input. When skeleton model selection processing (process P2) is thus completed, the program proceeds to draw mode (process P3).

Figure 5:
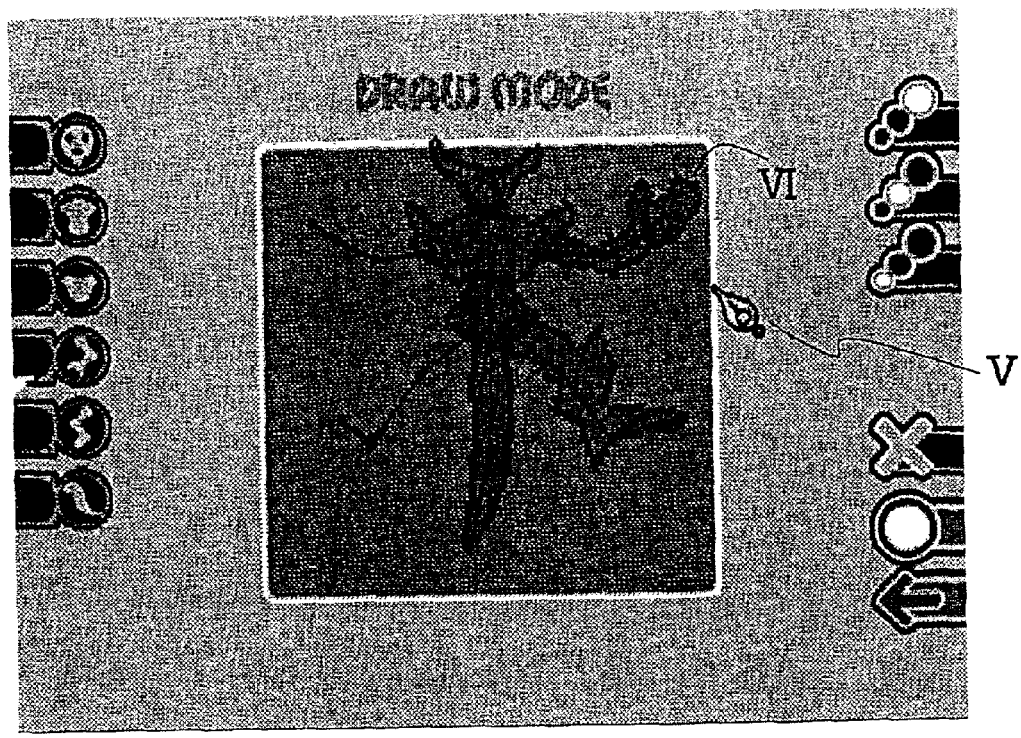
FIG. 5 shows in draw mode the display of an image in the process of drawing a human-type display object selected as in FIG. 3.
Figure 6:
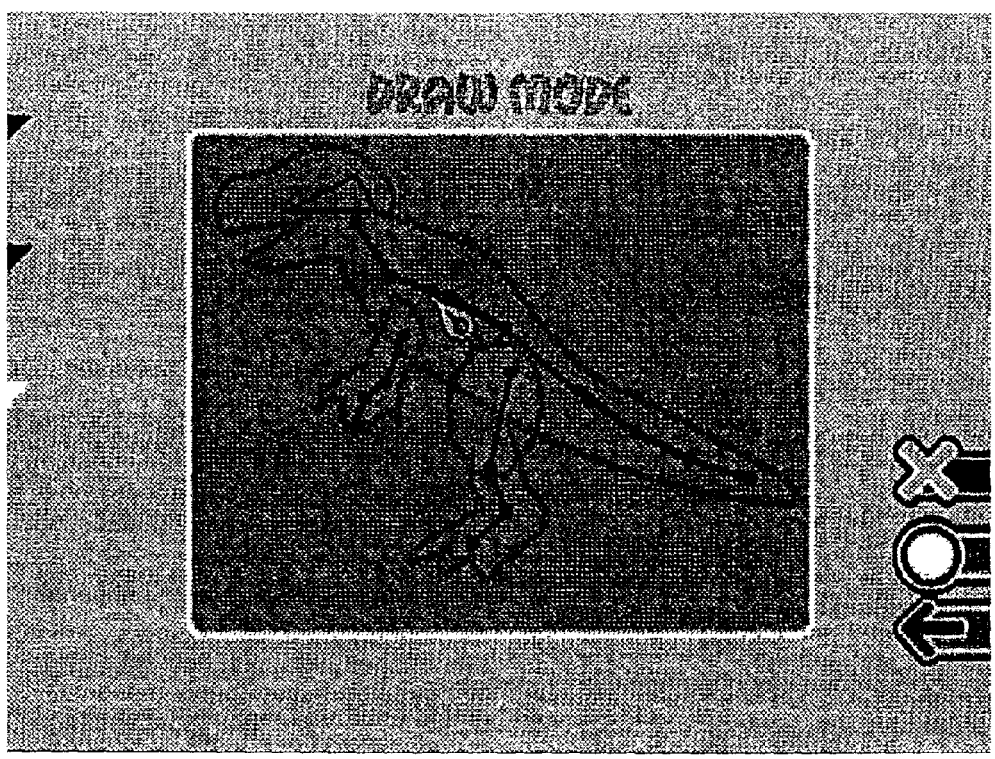
FIG. 6 shows in draw mode the display of an image in the process of drawing a dinosaur-type display object selected as in FIG. 4.

FIG. 5 and FIG. 6 show the image display in the process of drawing a selected human-type display object and dinosaur-type display object in draw mode, corresponding to FIG. 3 and FIG. 4 respectively.

These figures show perspective skeleton models with basic shape images superposed, as described above; referring to these basic shape images, an image input device 8 can easily be used to move the pen pointer V on the screen, forming an image of the outline of the display object. Accordingly, the movement trace VI of the pen pointer V is successively displayed.

As an aspect of this invention, the movement trace VI, that is the outline trace, is displayed as superposed on the displayed perspective skeleton model.

Since outline setting processing (process 4) is performed in the next process in this invention, the movement trace VI of the pen pointer V may be discontinuous, any number of movement traces may overlap with each other, and the trace need not surround the skeleton as a close trace at this stage.

Figure 7:
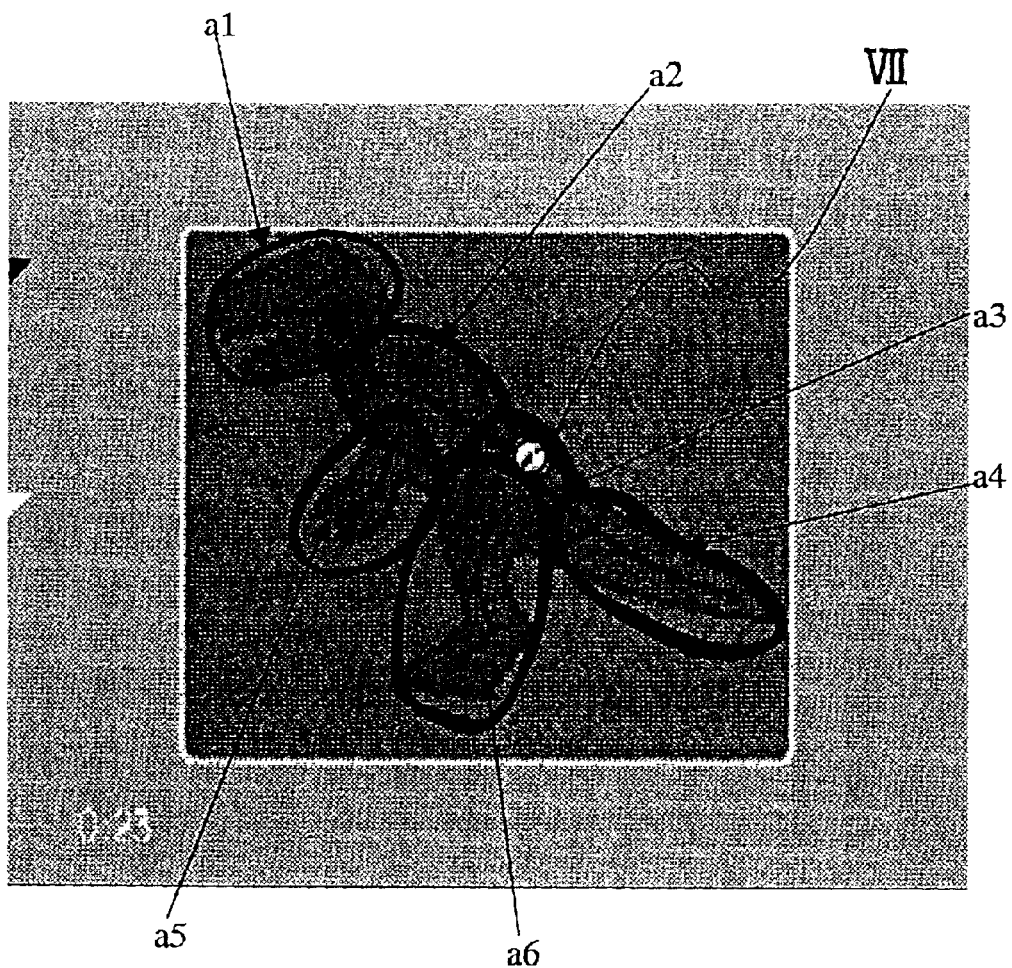
FIG. 7 shows a display in a screen in the outline setting process (process P4)

FIG. 7 shows the display of the screen in the outline setting process (process P4). In the previous draw mode (process P3), when the end is confirmed using a displayed button, not shown, the outline setting process is executed. In FIG. 7, VII is a time display symbol shown during processing.

In this invention, a region is set for each skeletal part of the perspective skeleton model. The movement trace VI of the pen pointer V inputted in the previous draw mode (process P3), is converted into closed outlines each for a skeletal part region.

In FIG. 7, the pen trace in draw mode is converted into closed outline traces and displayed for each of the head portion a1, torso portion a2, hip portion a3, tail portion a4, arm portions a5, and leg portions a6.

FIG. 8 is a schematic diagram which further explains the outline setting process (process P4). FIG. 8A and FIG. 8C are examples of movement traces of the pen pointer V; FIG. 8B and FIG. 8D are figures in which outlines are set corresponding to the movement traces of the pen pointer V in FIG. 8A and FIG. 8C.

B1 and B2 are skeletal parts of the perspective skeleton model; in this invention, as one feature, the skeletal parts each have regions R1, R2. The regions R1, R2 provided for each skeletal part of the display object are set such that parts of the regions R1, R2 overlap, with no gap occurring between the regions R1 and R2 even when the skeletal parts move at joints.

Figure 8A:
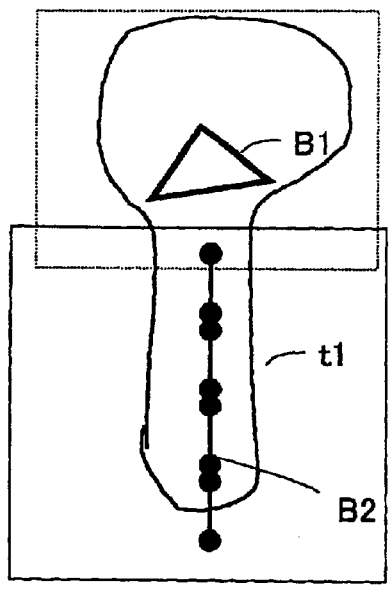
FIG. 8 is a schematic diagram series composed of FIGS. 8A to 8D which explain outline settings (process P4)
Figure 8B:
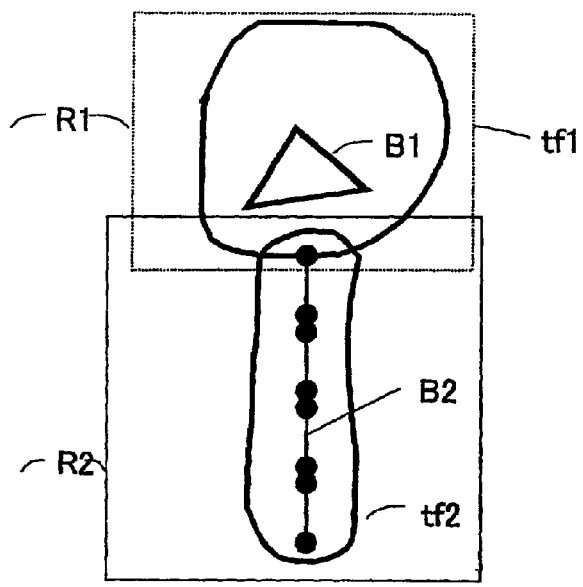

The movement trace t1 of the pen pointer V in FIG. 8A is a single continuous closed trace spanning the regions R1 and R2, and encloses the two skeletal parts B1, B2. In this example, in accordance with this invention, the movement trace t1 of the pen pointer V is separated by the regions R1, R2, and converted into two closed outlines in the regions R1, R2, respectively. FIG. 8B shows the two separated outlines tf1, tf2.

Figure 8C:
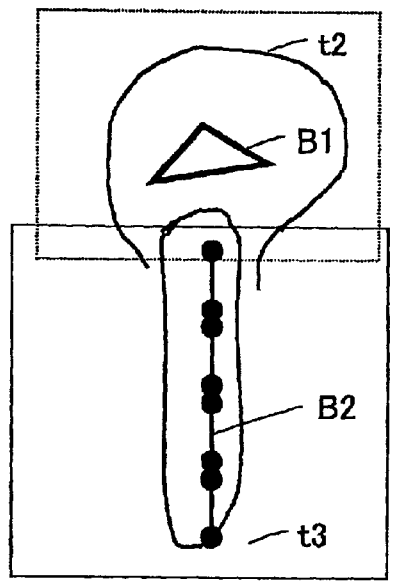

In the example of FIG. 8C, the movement trace t2 of the pen pointer V surrounding the skeletal part B1 is not closed within the region R1, while the movement trace t3 of the pen by pointer V surrounding the skeletal part B2 is closed.

Figure 8D:
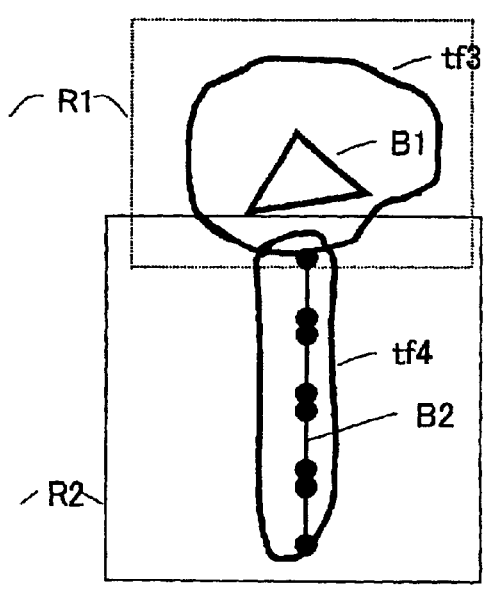

In this example, in accordance with this invention, the portion of the movement trace t2 of the pen pointer V which extends into the region R2 is deleted, and the remainder is converted into a closed outline tf3 within the region R1, as shown in FIG. 8D. On the other hand, the trace drawn within the region R2, that is, the movement trace t3 of the pen pointer V surrounding the skeletal part B2, protrudes outside the region R2. Hence as shown in FIG. 8D, this is converted so as to be closed within the region R2.

In the above outline setting process P4, by having all of the skeletal parts, the regions, and the movement traces of the pen pointer V in the form of bitmap data, calculations can be performed for conversion based on the respective bitmap coordinates.

Returning to the flow of processing in FIG. 2, two-dimensional (2D) display object data is generated through the outline setting process (process P4). Next, the drawing model of this two-dimensional display object data is converted, for each skeletal part, into a three-dimensional (3D) model (process P5).

In this conversion into 3D mode of the drawing model of the two-dimensional display object data, the algorithm described in the paper "Teddy: A Sketching Interface for 3D Freedom Design" presented at ACMSIGGRAPH '99 can be applied.

Here, in order to facilitate understanding, the procedure of the 3D conversion algorithm described in the above paper is explained briefly, using analogous drawings.

FIG. 9 through FIG. 12 are figures used to explain the algorithm for 3D conversion. As explained above, closed movement traces of the pen pointer V are obtained for each skeletal part by means of the outline setting process (process P4).

Figure 9A:
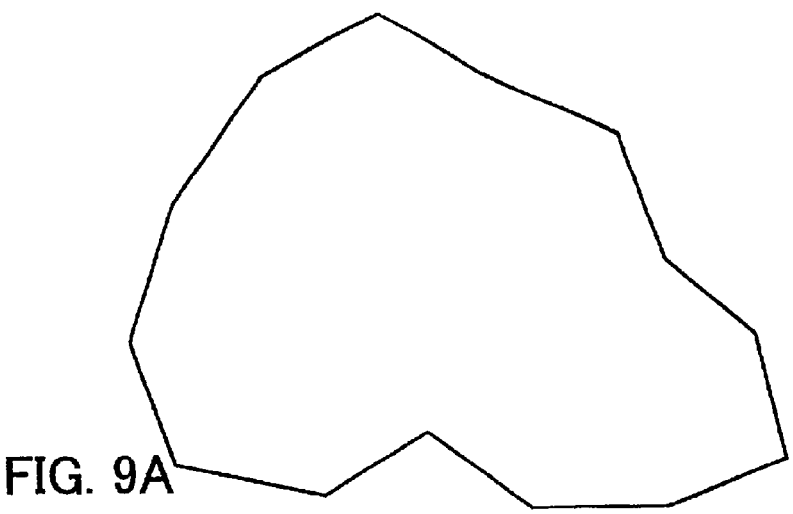
FIG. 9 is a first diagram series composed of FIGS. 9A to 9C which explain the algorithm for three-dimensional conversion.
Figure 9B:
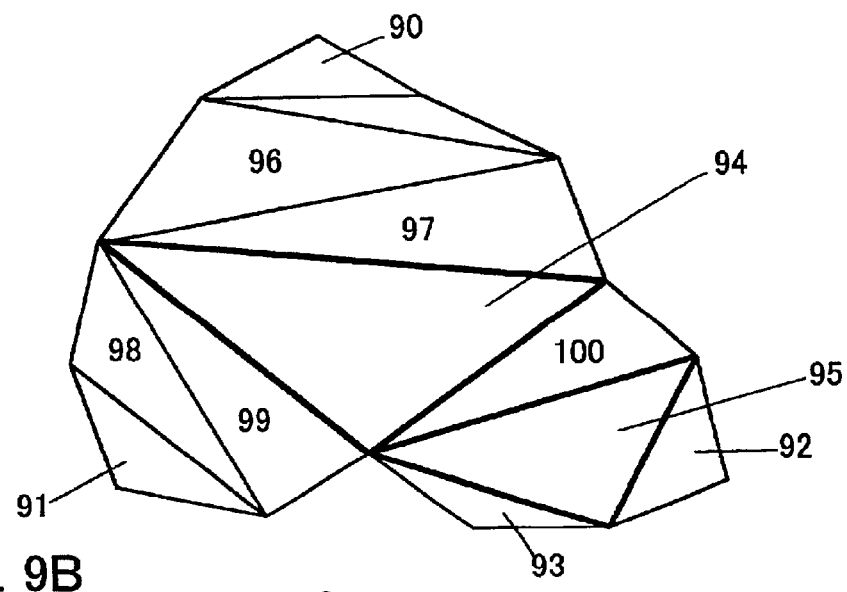

FIG. 9A is a figure in which, for a closed movement trace of the pen pointer V obtained for a single skeletal part, all the edges are formed using line segments of a fixed length. Next, the endpoints of the edges formed are connected to form a plurality of triangles (see FIG. 9B).

At this time, the triangles thus formed can be classified into three types. The first type is for triangles two edges of which are external edges (90 to 93 in FIG. 9B); the second type is for triangles (connecting triangles) no edges of which are external (94 and 95 in FIG. 9B). The third type is for triangles (sleeve triangles) one edge of which is external (96 to 100 in FIG. 9B).

Figure 9C:
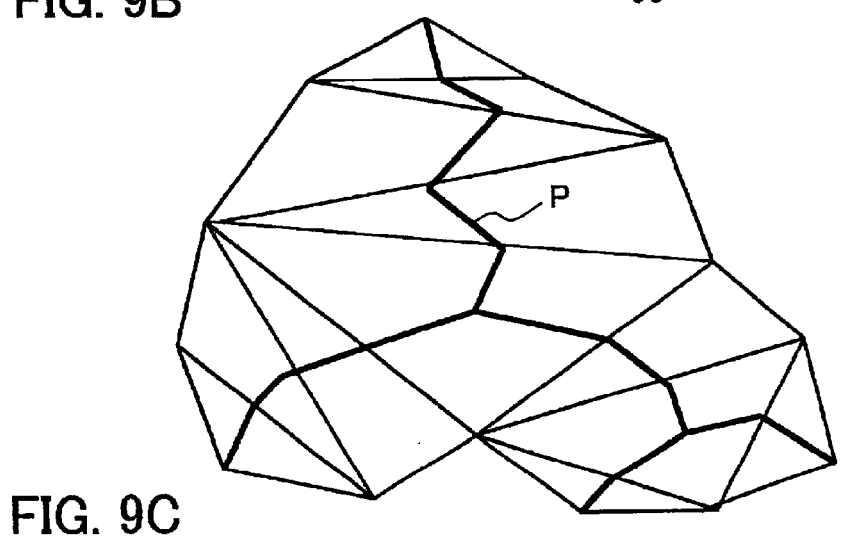

If the centers of the above connecting triangles 94, 95 and the centers of the edges of the sleeve triangles 96 to 100 are connected, a backbone like that shown by the bold lines P in FIG. 9C is obtained. In the above paper, the further pruning of unnecessary branches is explained.

Figure 10A:
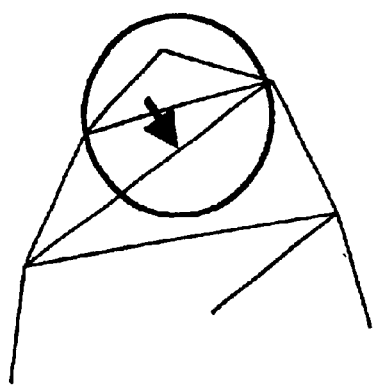
FIG. 10 is a second diagram series composed of FIGS. 10A to 10D which explain the algorithm for three-dimensional conversion.
Figure 10B:
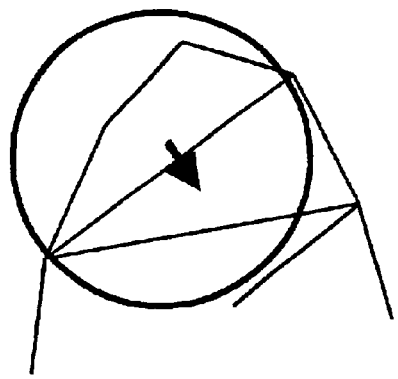

That is, as shown in FIG. 10, a circle is drawn having as diameter the interior edge of a triangle of the above first type, having two exterior edges (90 to 93 in FIG. 9B), and if a vertex of the triangle is within the above circle, the above interior edge is eliminated, and the triangle is united with the neighboring triangle (FIG. 10A and FIG. 10B). If the neighboring triangle to be united with the triangle is a sleeve triangle as described above, the united polygon is a polygon shape having three exterior edges (FIG. 10B).

Next, a circle having as diameter the interior edge of the united polygon is similarly drawn, and a judgment is made as to whether the vertices of the polygon are contained within the circle. The above processing is repeated until at least one of the vertices of the above polygon is outside the above circle, or until the neighboring triangle to be united with the polygon is a connecting triangle of the second type described above, with no exterior edges.

Figure 10C:
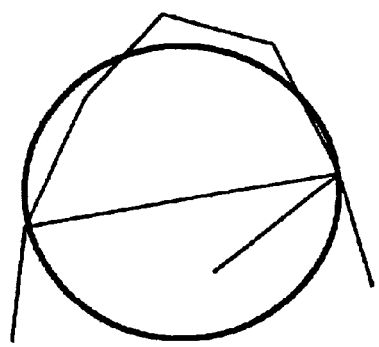
Figure 10D:
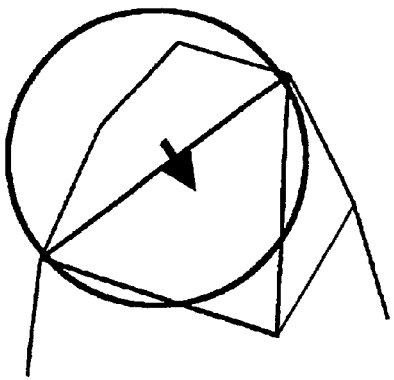

FIG. 10C shows a case in which some of the vertices of the polygon are outside the circle. FIG. 10D shows a case in which the neighboring triangle to be united is a connecting triangle of the second type described above, with no exterior edges.

Figure 11A:
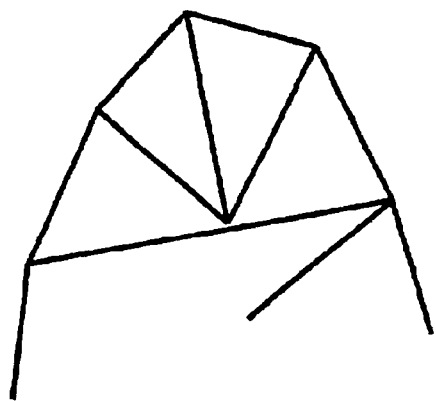
FIG. 11 is a third diagram series composed of FIGS. 11A and 11B which explain the algorithm for three-dimensional conversion.
Figure 11B:
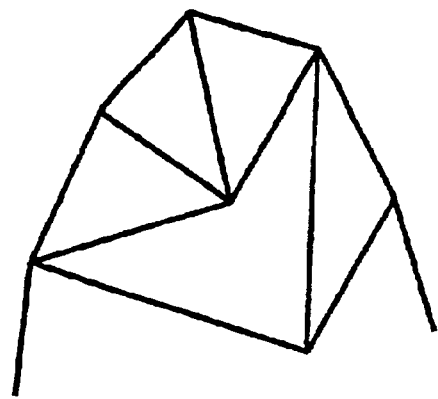

In the case of FIG. 10C, the vertices of the polygon and the midpoint of the interior edge are connected (see FIG. 11A); in the case of the example shown in FIG. 10D, the exterior-edge vertices of the polygon and the center point of the connecting triangle are connected (see FIG. 11B).

Figure 12A:
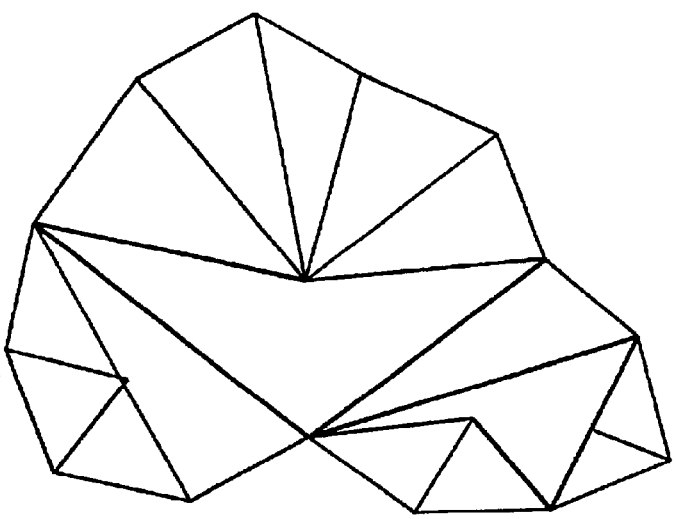
FIG. 12 is a fourth diagram series composed of FIGS. 12A to 12C which explain the algorithm for three-dimensional conversion.
Figure 12B:
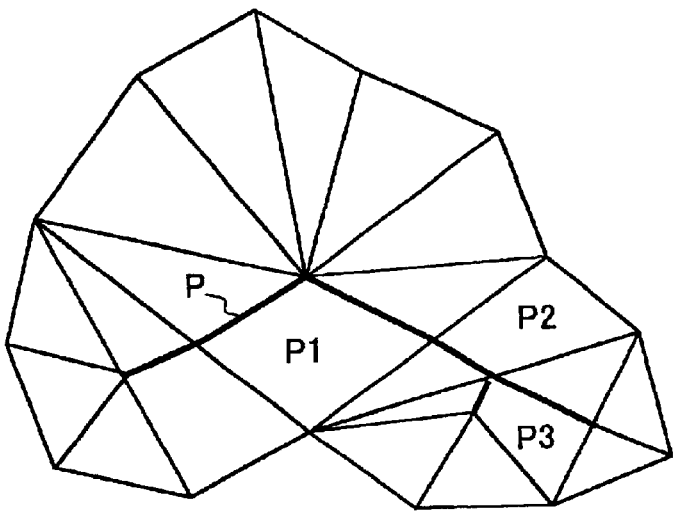
Figure 12C:
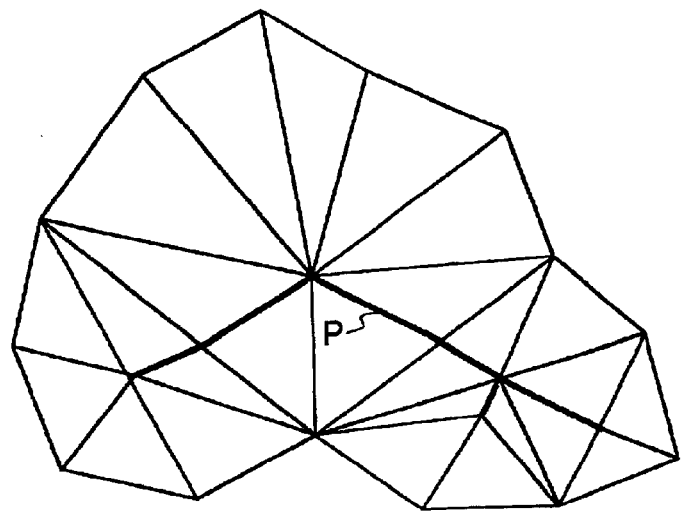

In this way, a two-dimensional polygonal figure is obtained in which the figure of FIG. 9 is subdivided into triangles (FIG. 12A). Next, by connecting the midpoints of the interior edges of sleeve triangles and connecting triangles, the triangles are divided by a backbone indicated by the bold line P (FIG. 12B). The polygons P1, P2, P3 resulting from this are divided into triangles, so that a complete two-dimensional triangular mesh is obtained (FIG. 12C).

The two-dimensional triangular mesh thus obtained is then expanded and converted into a three-dimensional mesh structure, following the algorithm described in the above paper. The algorithm for expansion and conversion to a three-dimensional mesh structure described in this paper is explained using FIG. 13.

Figure 13A:
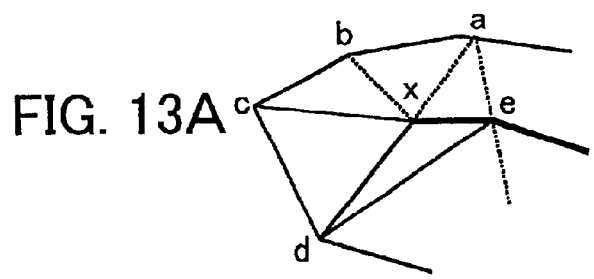
FIG. 13 is a fifth diagram series composed of FIGS. 13A to 13D which explain the algorithm for three-dimensional conversion.
Figure 13B:
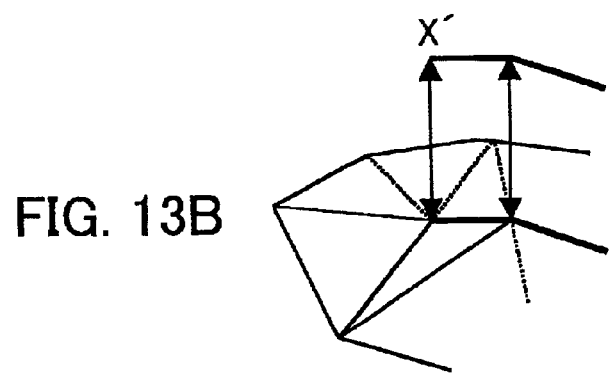

The vertex of a backbone edge as obtained above is raised up from the plane in which vertices X, a, b, c, d, and e lie, in proportion to the average value of the distances between the vertex and vertices directly connected to it. For example, in FIG. 13A, the vertex X of the backbone edge (shown in bold) is directly connected to the vertices a, b, c, d, e. Hence the vertex X is raised by an amount equal to the average of the distances between the vertex X and the vertex a, the vertex X and the vertex b, the vertex X and the vertex c, the vertex X and the vertex d, and the vertex X and the vertex e, and is converted to the vertex X' (FIG. 13B).

Figure 13C:
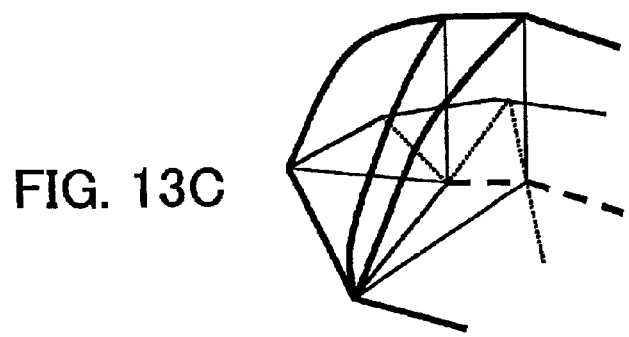
Figure 13D:
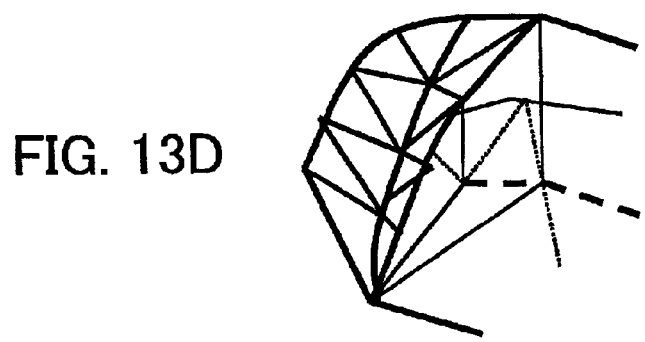

Further, the vertex X' converted in this way and the vertices of external edges are connected by the arcs of a quarter-sphere (FIG. 13C). An appropriate polygon mesh is obtained by binding together raised neighboring edges (FIG. 13D).

Accordingly, the two-dimensional bitmap data for drawing as shown in FIG. 7 is expanded and converted into three-dimensional polygon data for each of the skeletal parts of the drawing model. By this means, 3D conversion of the drawing model (process P5) is completed. The polygon data of a 3D display object obtained in this way is stored or registered in RAM 3 (process P6).

As a concrete embodiment according to the present invention in which an attribute parameter (modified parameter), obtained by modifying the attribute parameter (base parameter) of the basic body according to the ratio of the outline trace associated with the skeleton model to the basic body data, is attached to the data of the expanded and converted three-dimensional display object image, when registering this 3D display object polygon data, attribute parameters characterizing the behavior mode of the display object corresponding to the polygon data of the 3D display object are attached. Hence attached parameters are set together with the polygon data of the 3D display object in the above RAM 3.

As one embodiment of this invention, a plurality of attribute parameters are prepared as attribute parameters characterizing the behavior mode. Each of these attribute parameters comprises a "base parameter" and a "modified parameter".

The base parameter is predetermined for the display object and can be accumulated in the course of the game. That is, a fixed value is given as an initial value, and in the course of the game, points are added each time prescribed conditions are satisfied.

On the other hand, the modified parameter is a parameter provided corresponding to the shape of the display object when the shape of the display object is generated for the first time through drawing by the game player, or when the shape is redrawn.

First, three-dimensional basic body data for an average physique is prepared in advance for each of the plurality of display objects prepared in the skeleton selection menu display (process P1) of this invention. The CPU 2 calculates various parameters (attribute parameters) as shown below by comparing the three-dimensional basic body data with drawn figures.

Figure 14A:
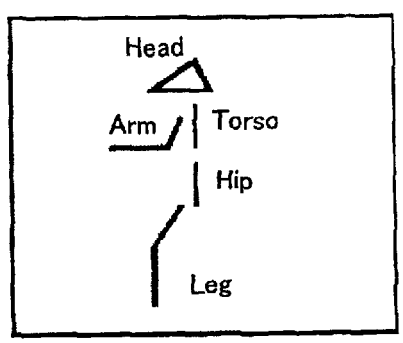
FIG. 14 is a set of diagrams composed of FIGS. 14A and 14B showing an example of skeletal parts of a human-type display object.
Figure 14B:
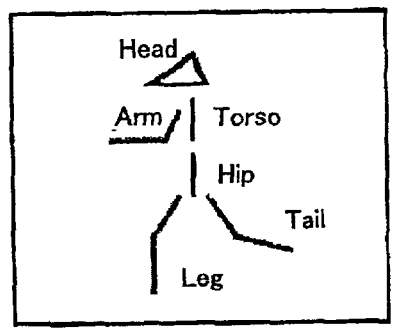

As an embodiment, attributes are defined for each skeletal part constituting each display object. For example, the skeleton shown in FIG. 14 for a human-type display object has head, arm, torso, hip, and leg parts; power parameters as one type of the above-described attribute parameters are defined for part attributes for the arm and leg, and a speed parameters as another type of the above-described attribute parameter is defined for the leg.

Figure 15A:
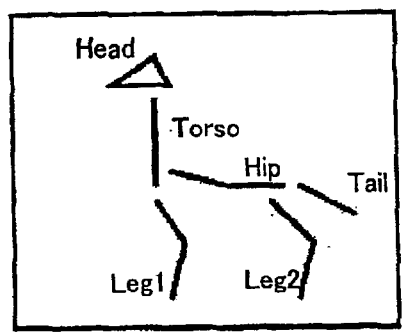
FIG. 15 is a set of diagrams composed of FIGS. 15A and 15B showing an example of skeletal parts of an animal-type display object.
Figure 15B:
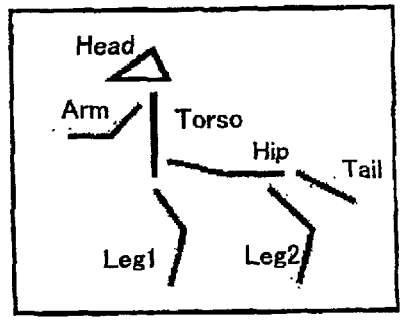

In FIG. 15, an animal-type skeleton is shown; the skeleton of FIG. 15A has head, torso, hip, leg 1, leg 2, and tail parts, while the skeleton of FIG. 15B has head, arm, torso, hip, leg 1, leg 2, and tail parts. Power parameters are set as part attributes for the head, arm and leg 1, and speed parameters are set for the leg 1 and leg 2.

Based on such skeletal part information, parameter values such as the following are used for display objects for which outlines are drawn.

Total volume: Total volume of all parts.
Power parts volume total: The total volume of all power parts defined for each skeleton, where parts having power as a part attribute are called power parts.
Power parts volume ratio: The proportion of the power parts volume total in the total volume ((power parts volume total)/(total volume)).
Speed parts volume total: The total volume of all speed parts defined for each skeleton, where parts having speed as a part attribute are called speed parts.
Speed parts volume ratio: The proportion of the speed parts volume total in the total volume ((speed parts volume total)/(total volume)).
Average volume: The average volume of part units ((total volume)/(total number of parts)).

According to one exemplary method for modifying the attribute parameter of the basic body according to the ratio of the outline trace associated with the skeleton model to the basic body data, the total power parts volume and power parts volume ratio for a drawn display object, determined as described above, are compared with those of the corresponding three-dimensional basic body to set modifier values for the drawn display objects as follows.

Determination of a modifier value by comparison of total power parts volume: For every 10% that the volume of the drawn parts is larger than that of the basic body, it is modified by +1. Conversely, for every 10% that the drawn parts volume is smaller than that of the basic body, the value is modified by −1.

Determination of a modifier value by comparison of power parts volume ratio: For every 10% that the volume ratio of the drawn parts is larger than that of the basic body, the value is modified by +1. Conversely, for every 10% that the drawn parts volume ratio is smaller than that of the basic body, the value is modified by −1.

Modified parameters are determined from the base parameters as follows.

If the power parameter of the basic body as one type of the base parameters is taken to be "5", then the modified power parameter of the drawn display object is 5+(modifier value for the total power parts volume)+(modifier value for the power parts volume ratio). Accordingly, when the volume ratio of the drawn parts is 10% larger than that of the basic body, the modified power parameter is 5+1=6.

Similarly to the above calculation of the power parameter for a drawn display object, the modified speed parameter for a drawn display object will be 5+(total speed parts volume modifier value)+(speed parts volume ratio modifier value). Here the speed parameter of the basic body as one type of the base parameters is taken to be "5".

In this way, both the power parameter and the speed parameter of a drawn display object are related to the volume of skeletal parts concerned with power and speed. Hence the game player can, when drawing a display object, draw part shapes in anticipation of the desired behavior modes of the display object. This is explained in FIG. 16 and FIG. 17.

Figure 16:
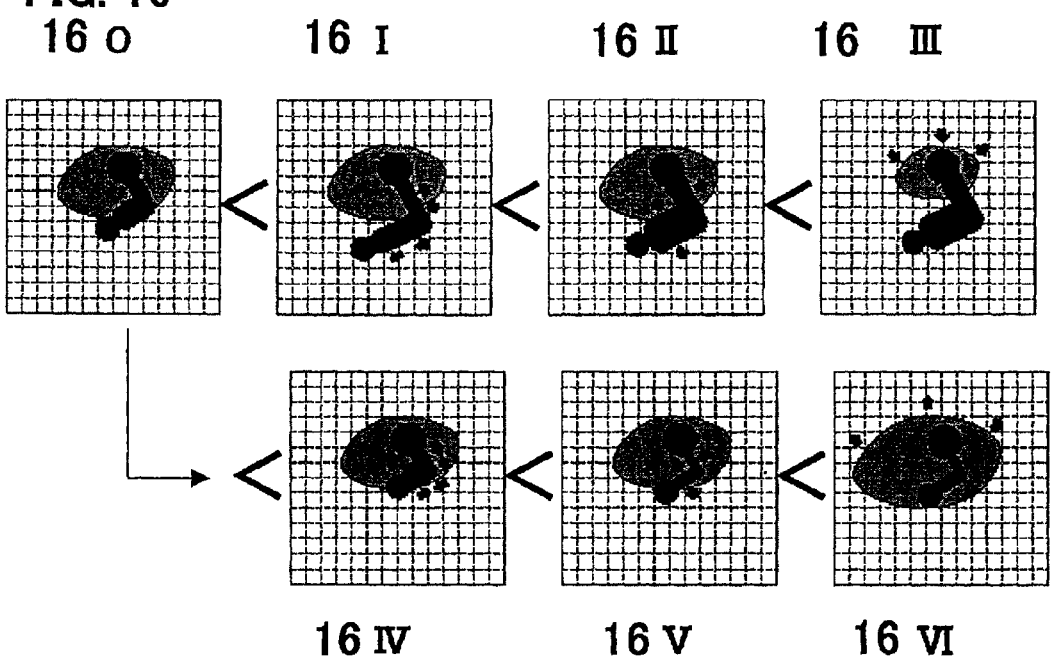
FIG. 16 is a diagram which explains a case in which the shape of an arm part is changed.

FIG. 16 is a diagram which explains a case in which the shape of an arm part is changed.

In FIG. 16, compared with the basic shape (16O), the arm may be lengthened (16I), made thicker (16II), and the fractional volume of the arm may be increased (16III). By this means, a display object may be endowed with a strong punching strength attribute, in a shape which is suitable for generating an animal-type display object with arm strength, such as a gorilla.

On the other hand, compared with the basic shape (16O), the arm may be made shorter (16IV), thinner (16V), and the fractional volume of the arm may be reduced (16VI). By this means, an arm with little power, which is only ornamental, can be generated.

Figure 17:
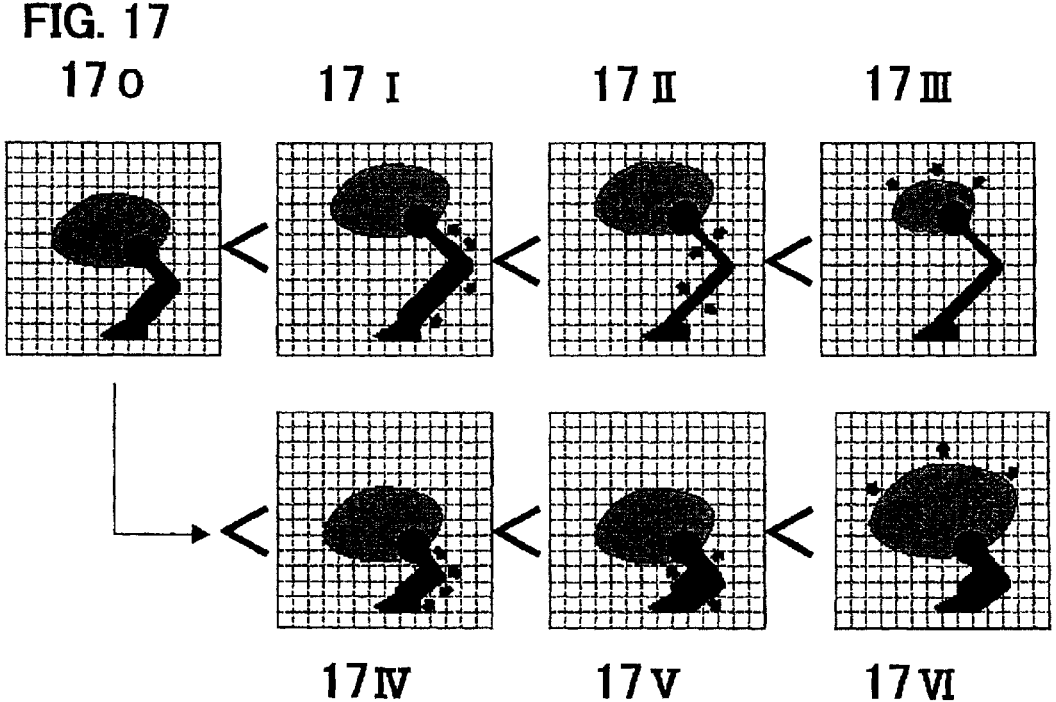
FIG. 17 is a diagram which explains a case in which the shape of a leg part is changed.

FIG. 17 is a diagram which explains a case in which the shape of a leg part is changed.

In FIG. 17, compared with the basic shape (17O), the leg may be lengthened (17I), made thinner (17II), and the fractional volume of the leg may be increased (17III). By this means, a display object may be endowed with a high speed attribute, in a shape which is suitable for generating an animal-type display object with fast running speed, such as an impala.

Or, compared with the basic shape (17O), the leg may be made shorter (17IV), thicker (17V), and the fractional volume of the leg may be reduced (17VI). By this means, the attributes of an animal-type display object in a heavy weight class with considerable power can be imparted, in a shape suitable for generating a massive animal-type display object, such as an elephant.

In the above explanation, a method is employed in which attribute parameters are set in association with the three-dimensional volumes of display objects; but the present invention is not limited to this, and the area of the two-dimensional display object image as drawn may be compared with the area of the corresponding basic body.

Further, modifier values for the attack and defense levels may also be set corresponding to drawn shapes, as explained in FIG. 18.

Figure 18A:
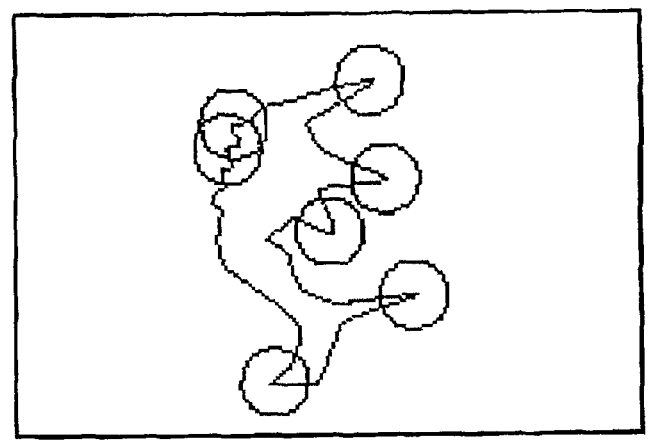
FIG. 18 is a set of diagrams composed of FIGS. 18A to 18C to explain the setting of modifier values for offense and defense levels associated with a drawn form.

As one example, the above modifier values for the attack and defense levels may be set according to the number of protrusions constituting each part of the drawn model. In FIG. 18A, circled portions are protrusions; for example, a portion having an angle of less than 45° may be defined as a protrusion.

Modifier values for the attack and defense levels are set corresponding to the number of protrusions constituting each of the torso, arm, and leg parts. As an example, these values may be given as follows.

When the number of protrusions in a torso part is 0, a modifier value for the attack power level of 1 is assigned. When the number of protrusions is 2 to 4, the modifier value for the short-range attack power level is set to be 1. When the number of protrusions is 5 or greater, the modifier value for the long-range attack power level is set to be 1.

When the number of protrusions in an arm part is 0, a modifier value for the defense power level of 0 is assigned. When the number of protrusions is 2 to 4, the modifier value for the long-range attack power level is set to be 2. When the number of protrusions is 5 or more, the modifier value for the long-range attack power level is set to be 3.

When the number of protrusions in a leg part is 0, a modifier value for the attack power level of 2 is assigned. When the number of protrusions is 2 to 4, the modifier value for the short-range attack power level is set to be 2. When the number of protrusions is 5 or more, the modifier value for the attack power level at crossing range is set to be 3.

Figure 18B:
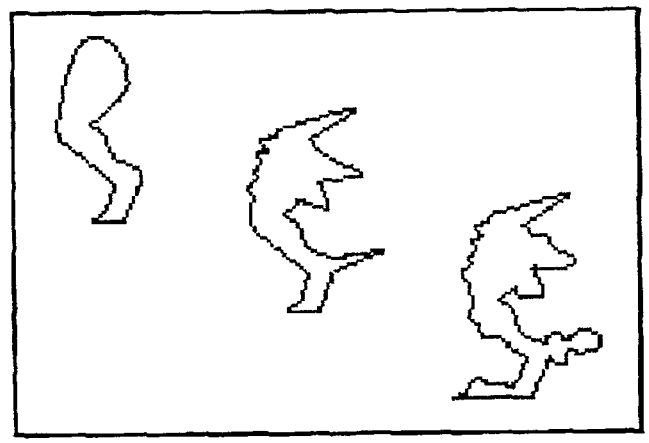

As shown in FIG. 18B, modifier values for the attack and defense power levels can also be set for each of the torso, arm and leg parts according to the "smoothness" of each part shape. That is, similarly to the explanation of FIG. 18A, modifier values for the attack and defense levels can be set according to whether the shape, for each torso, arm and leg part, is "smooth", "rough", or "extremely rough".

Figure 18C:
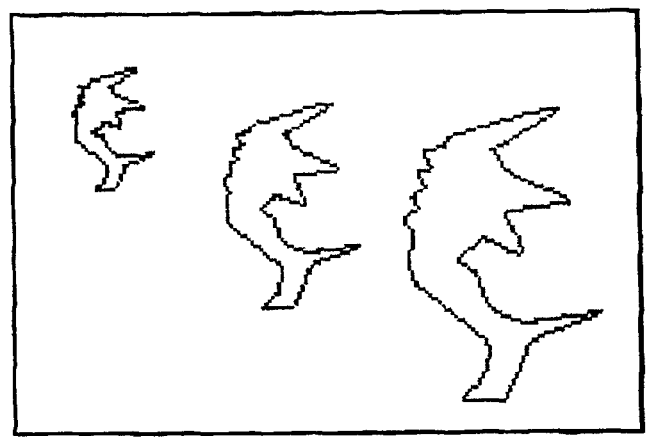

Further, as shown in FIG. 18C, similarly to the explanation of FIG. 18A, modifier values for the attack and defense levels can be set according to the stroke length (short, average, long) of parts for each torso, arm, and leg part.

Also, parameter values can be changed according to the type of texture applied to a drawn display object. That is, in the processing flow of FIG. 2, when registering three-dimensional display object data, the game player who has drawn an object can also select a texture appropriate to the display object, as part of the attached parameter values.

Modifier values set for the selected texture are attached, and the texture corresponding to the modifier values is applied during drawing. Texture colors such as the following can be set for each attribute or modifier value.

| Attribute | Color | Modified value *1 | Modified value *2 |
|---|---|---|---|
| None | Gray to black | 0 | 0 |
| Earth | Yellow to dark brown | −3 | +3 |
| Water | Light blue to blue | 1 | +1 |
| Fire | Orange to red | 1 | 0 |
| Wind | Light green to dark green | −1 | +1 |
| Heaviness | Purple to black | −2 | +2 |
| Ice | White to light blue | +1 | 0 |
| Light | White to yellow (glossy) | +3 | −3 |
| Thunder | Yellow to | +4 | −3 |

-continued

| Attribute | Color | Modified value *1 | Modified value *2 |
|---|---|---|---|
| | yellow-green (metallic) | | |

*1 Modified value for offense.
*2 Modified value for defense,

Here the parameters imparted to a drawn display object as explained above are not imparted only when the object is drawn, but are updated to newly modified parameters each time the drawn display object data is updated.

In addition to the above parameter settings, parameters relating to the lifetime of the display object can also be set.

As explained above, the generated three-dimensional display object data is, as a display object to be manipulated by the game player in the game program execution process (process P7), subjected to the existing texture processing according to the attached attribute parameter values and processing to convert coordinates to a two-dimensional screen, and then is displayed on the display device 6.

Figure 19:
FIG. 19 is an image of a dinosaur model, displayed using three-dimensional polygon data, drawn after selecting the dinosaur perspective skeleton in FIG. 4.
Figure 20:
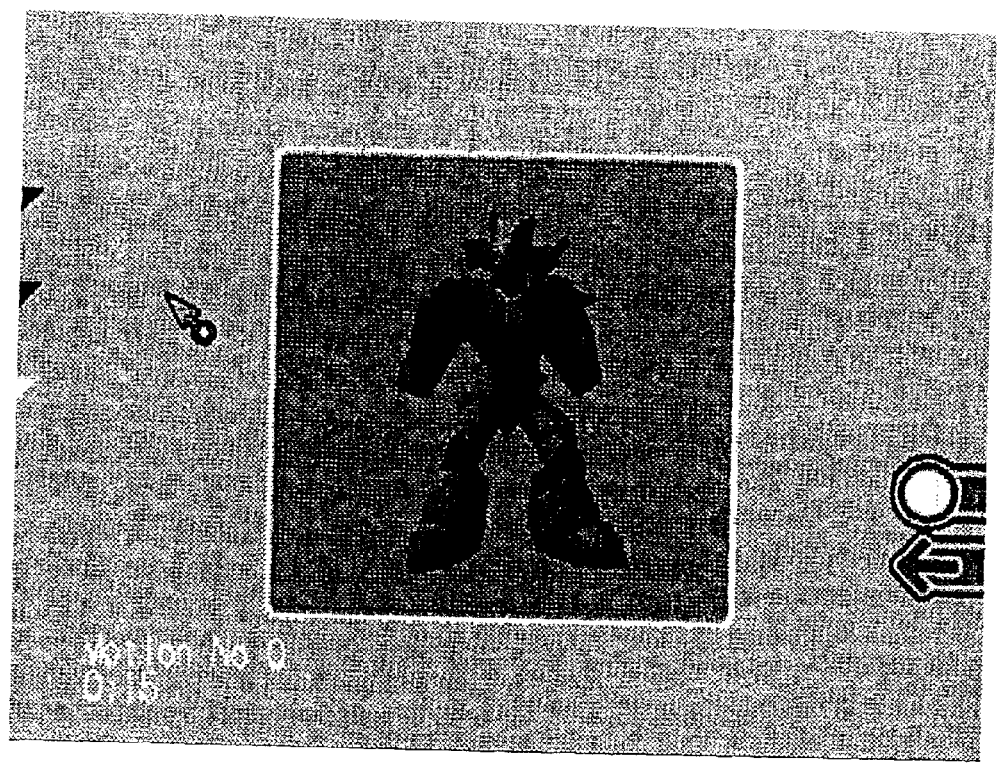
FIG. 20 is a first image of a model generated after drawing a human-type perspective skeleton.
Figure 21:
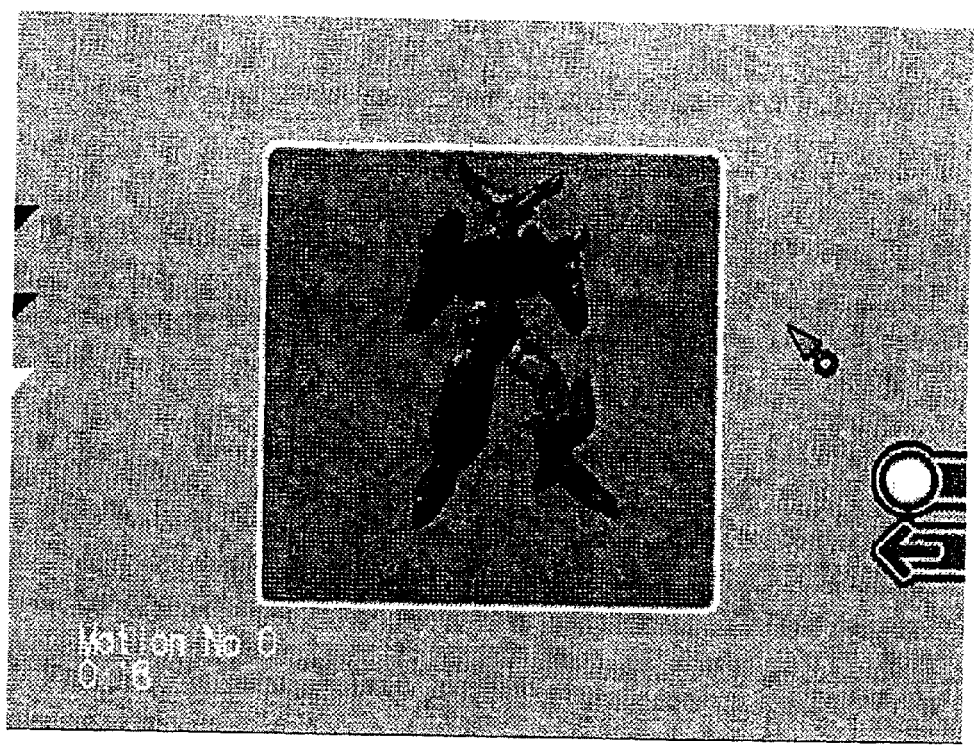
FIG. 21 is a second image of a model generated after drawing a human-type perspective skeleton; and, FIG. 22 is a third image of a model generated after drawing a human-type perspective skeleton.
Figure 22:
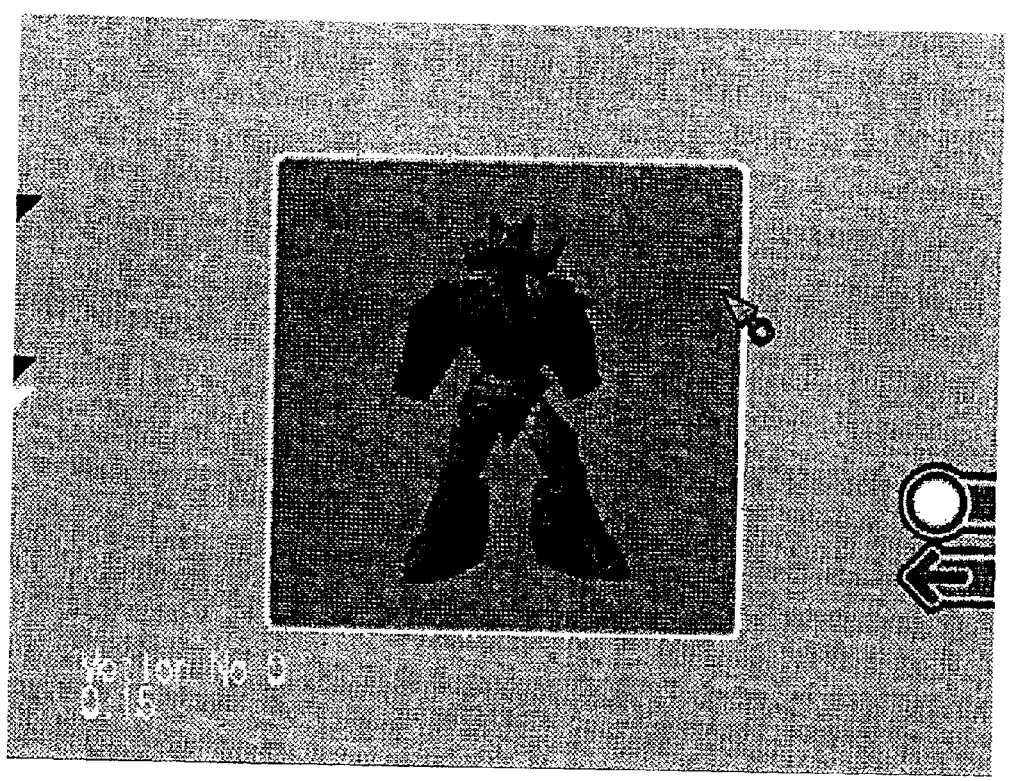

FIG. 19 is an image of a dinosaur model, displayed using 3D polygon data, drawn after selecting the dinosaur perspective skeleton in FIG. 4. FIG. 20 through FIG. 22 show images of models generated by drawing from a human-type perspective skeleton. As is understood from a comparison of FIG. 20 through FIG. 22, even for the same model, the external image changes according to the manner of drawing the outline in draw mode, the texture selected and similar.

By means of this invention, display objects can easily be generated with the shape preferred by the game player himself. Further, the generated display object can be employed as a display object to be manipulated by the game player himself in the computer game. By this means, the game player can enjoy the game by manipulating a display object matched to the game player's preferences with greater variety.

Further, display object data with three-dimensional coordinates is generated in association with a skeleton model serving as a basis for movement of the display object, so that movement of the created display object can be easily controlled. As a result, the game player can relate his feeling more closely to the display object he has himself created.

Also, attribute parameters are set corresponding to the characteristics of a generated display object, so that during game program execution the display object can be endowed with movement according to the attribute parameters.

Such movement during program execution is also called the behavior mode in this specification. Accordingly, the behavior mode of the generated three-dimensional display object can be characterized by the above-described attribute parameters. Slow movement, quick movement, movement with its direction slowly changing, movement with its direction rapidly changing, and other similar movements can be enumerated as examples of the characterized behavior modes.

Characterization of the behavior mode can also be achieved by selecting motions from among a multiple number of motion patterns (motion data) according to the length and/or thickness of the legs as shown in FIG. 17, to change the motions themselves. For example, for a display object having thick and short legs, one can select a motion data in which the object drags its feet as it walks. For a display object having thin and long legs, one can select a motion data in which the object strides briskly. Such selection can be related not only to the legs as described above but also to the size and shape of head, the thickness and length of arms and torso, etc. Hereupon, it is to be noted that the embodiments explained with reference to the above drawings are intended to aid understanding of this invention, and do not limit the scope of the invention.

What is claimed is:

1. A display object generation program executed by information processing equipment, the program performing the steps of:
    displaying a skeleton model comprising a plurality of skeletal parts for the display object on a display device;
    displaying an input outline trace on the display device formed using an image input device;
    associating the input outline trace with the skeleton model of said display object;
    expanding and converting the outline trace associated with the skeleton model into a three-dimensional display object image;
    setting a basic body having specific base attribute parameters in advance for said skeleton model;
    modifying the base attribute parameters of said basic body according to the ratio of the outline trace associated with said skeleton model to data associated with said basic body, to obtain modified attribute parameters including at least one of power parameters and speed parameters;
    attaching the modified attribute parameters to the data of said expanded and converted three-dimensional display object image; and
    displaying data of the expanded and converted three-dimensional display object image on said display device;
    wherein, said step of expanding and converting the outline trace further comprises:
    converting said input outline trace into closed outline traces corresponding to each of said plurality of skeletal parts;
    when there are a plurality of said input outline traces for said skeleton model, converting said outline traces into a single closed outline trace formed by connecting the outermost traces of said outline traces; and
    when said input outline trace is input to span a plurality of skeletal parts, converting said input outline trace into closed outline traces for each of said plurality of skeletal parts.

2. The display object generation program according to claim 1, wherein
    the skeleton model of said display object is displayed, on said display device, with the basic shape image of said display object and the skeletal parts constituting said skeleton model being superimposed with each other.

3. The display object generation program according to claim 1, wherein
    said program constitutes a game program executed by said information processing equipment.

4. The display object generation program according to claim 3, wherein
    a behavior mode of the generated three-dimensional display object is characterized by said attribute parameters.

5. The display object generation program according to claim 3, wherein
    said attribute parameter can be modified through selection of a texture to be applied to the generated three-dimensional display object.

6. The display object generation program according to claim 3, wherein
    said attribute parameter can be modified through an area of the closed outline traces associated with a plurality of skeletal parts constituting said skeleton model, or through a volume of the generated three-dimensional object.

7. The display object generation program according to claim 1, wherein said input outline trace comprises at least one movement trace formed using said image input device.

8. The display object generation program according to claim 1, wherein said image input device comprises a mouse.

9. The display object generation program according to claim 1, wherein said image input device is a user interface device which permits a user to form said input outline trace such that said display device displays said input outline trace.

10. The display object generation program according to claim 1, wherein said image input device manipulates a pen pointer on said display device to form said input outline trace based on user inputs.

11. The display object generation program according to claim 1, further comprising:
    storing at least one first attribute data associated with a basic body for said skeleton model;
    determining a modifier value based on a ratio of data associated with said outline trace to data associated with data for said basic body comprising said first attribute data;
    determining a second attribute data based on said modifier value; and
    storing said second attribute data with data of said expanded and converted three-dimensional display object.

12. The display object generation program according to claim 11, wherein said first attribute is a base parameter and said second attribute is a modified parameter.

13. The display object generation program according to claim 12, wherein said second attribute data is further determined based on a determination of a percentage difference between data associated with said outline trace to data associated with data for said basic body comprising said first attribute data.

14. The display object generation program according to claim 13, wherein said second attribute data is increased based on a positive said difference.

15. The display object generation program according to claim 13, wherein said second attribute is decreased based on a negative said difference.

16. A display object generation method, comprising:
    displaying a skeleton model comprising a plurality of skeletal parts for a display object on a display device;
    displaying an input outline trace on the display device formed using an image input device;
    associating the input outline trace with the skeleton model of said display object;
    expanding and converting the outline trace associated with the skeleton model into a three-dimensional display object image;
    setting a basic body having specific base attribute parameters in advance for said skeleton model;
    modifying the base attribute parameters of said basic body according to the ratio of the outline trace associated with said skeleton model to data associated with said basic body, to obtain modified attribute parameters including at least one of power parameters and speed parameters;

attaching the modified attribute parameters to the data of said expanded and converted three-dimensional display object image; and displaying data of the expanded and converted three-dimensional display object image on said display device;

wherein, said step of expanding and converting the outline trace further comprises:

converting said input outline trace into closed outline traces corresponding to each of said plurality of skeletal parts;

when there are a plurality of said input outline traces for said skeleton model, converting said outline traces into a single closed outline trace formed by connecting the outermost traces of said outline traces; and when said input outline trace is input to span a plurality of skeletal parts, converting said input outline trace into closed outline traces for each of said plurality of skeletal parts.

17. A recording medium storing a display object generation program to be executed by information processing equipment, the program performing the steps of:

displaying a skeleton model comprising a plurality of skeletal parts for a display object on a display device;

displaying an input outline trace on the display device formed using an image input device;

associating the input outline trace with the skeleton model of said display object;

expanding and converting the outline trace associated with the skeleton model into a three-dimensional display object image;

setting a basic body having specific base attribute parameters in advance for said skeleton model;

modifying the base attribute parameters of said basic body according to the ratio of the outline trace associated with said skeleton model to data associated with said basic body to obtain modified attribute parameters including at least one of power parameters and speed parameters;

attaching the modified attribute parameters to the data of said expanded and converted three-dimensional display object image; and displaying data of the expanded and converted three-dimensional display object image on said display device;

wherein, said step of expanding and converting the outline trace further comprises:

converting said input outline trace into closed outline traces corresponding to each of said plurality of skeletal parts;

when there are a plurality of said input outline traces for said skeleton mode, converting said outline traces into a single closed outline trace formed by connecting the outermost traces of said outline traces; and when said input outline trace is input to span a plurality of skeletal parts, converting said input outline trace into closed outline traces for each of said plurality of skeletal parts.

18. A recording medium storing a game program comprising a display object generation program to be executed by information processing equipment, the program performing the steps of:

displaying a skeleton model comprising a plurality of skeletal parts for a display object on a display device;

displaying an input outline trace on the display device formed using an image input device;

associating the input outline trace with the skeleton model of said display object;

expanding and converting the outline trace associated with the skeleton model into a three-dimensional display object image;

setting a basic body having specific base attribute parameters in advance for said skeleton model;

modifying the base attribute parameters of said basic body according to the ratio of the outline trace associated with said skeleton model to data associated with said basic body, to obtain modified attribute parameters including at least one of power parameters and speed parameters;

attaching the modified attribute parameters to the data of said expanded and converted three-dimensional display object image; and displaying data of the expanded and converted three-dimensional display object image on said display device;

wherein, said step of expanding and converting the outline trace further comprises:

converting said input outline trace into closed outline traces corresponding to each of said plurality of skeletal parts;

when there are a plurality of said input outline traces for said skeleton model, converting said outline traces into a single closed outline trace formed by connecting the outermost traces of said outline traces; and when said input outline trace is input to span a plurality of skeletal parts, converting said input outline trace into closed outline traces for each of said plurality of skeletal parts.

19. A display object generation program comprising:

a processing sequence for displaying a plurality of skeletal models comprising a plurality of skeletal parts for a display object on a display device;

a processing sequence for selecting one of said skeletal models based on a user input;

a processing sequence for displaying an input outline trace on the display device formed based on at least another user input from an image input device;

a processing sequence for associating the input outline trace with the skeleton model of said display object;

a processing sequence for generating a three-dimensional display object image based upon expanding and converting data associated with the outline trace associated with the skeleton model;

a processing sequence for setting a basic body having specific base attribute parameters in advance for said skeleton model;

said basic body according to the ratio of the outline trace associated with said skeleton model to data associated with said basic body, to obtain modified attribute parameters including at least one of power parameters and speed parameters;

a processing sequence for attaching the modified attribute parameters to the data of said expanded and converted three-dimensional display object image; and a processing sequence for displaying the expanded and converted three-dimensional display object image on said display device.

20. The display object generation program according to claim 19, wherein said processing sequence associating the input outline trace with the skeleton model of said display object further comprises a processing sequence for converting said input outline trace into closed outline traces corresponding to each of said plurality of skeletal parts.

21. The display object generation program according to claim 19, wherein said processing sequence associating the input outline trace with the skeleton model of said display object further comprises a processing sequence for converting said outline traces into a single closed outline trace formed by connecting the outermost traces of said outline traces when there are a plurality of said input outline traces for said skeleton model.

22. The display object generation program according to claim 19, wherein said processing sequence associating the input outline trace with the skeleton model of said display object further comprises a processing sequence for converting said input outline trace into closed outline traces for each of said plurality of skeletal parts when said input outline trace is input to span a plurality of skeletal parts.

23. The display object generation program according to claim 22, wherein said input outline trace comprises at least one movement trace formed using said image input device.

24. The display object generation program according to claim 22, wherein said image input device is a user interface device which permits a user to form said input outline trace such that said display device displays said input outline trace.

25. The display object generation program according to claim 22, further comprising:

storing at least one first attribute data associated with a basic body for said skeleton model;

determining a modifier value based on a ratio of data associated with said outline trace to data associated with data for said basic body comprising said first attribute data;

determining a second attribute data based on said modifier value; and storing said second attribute data with data of said expanded and converted three-dimensional display object.

26. The display object generation program according to claim 25, wherein said first attribute is a base parameter and said second attribute is a modified parameter.

27. The display object generation program according to claim 25, wherein said second attribute data is further determined based on a determination of a difference between data associated with said outline trace to data associated with data for said basic body comprising said first attribute data.

28. The display object generation program according to claim 25, wherein said second attribute data can be modified through selection of a texture to be applied to the generated three-dimensional display object.

29. The display object generation program according to claim 25, wherein said second attribute data can be modified based upon an area of the closed outline traces associated with said plurality of skeletal parts constituting said skeleton model or based upon a volume of the generated three-dimensional object.

* * * * *